Dec. 26, 1933. J. J. OHLIS 1,940,968
PANELING STRUCTURE
Filed Nov. 28, 1932 2 Sheets-Sheet 1
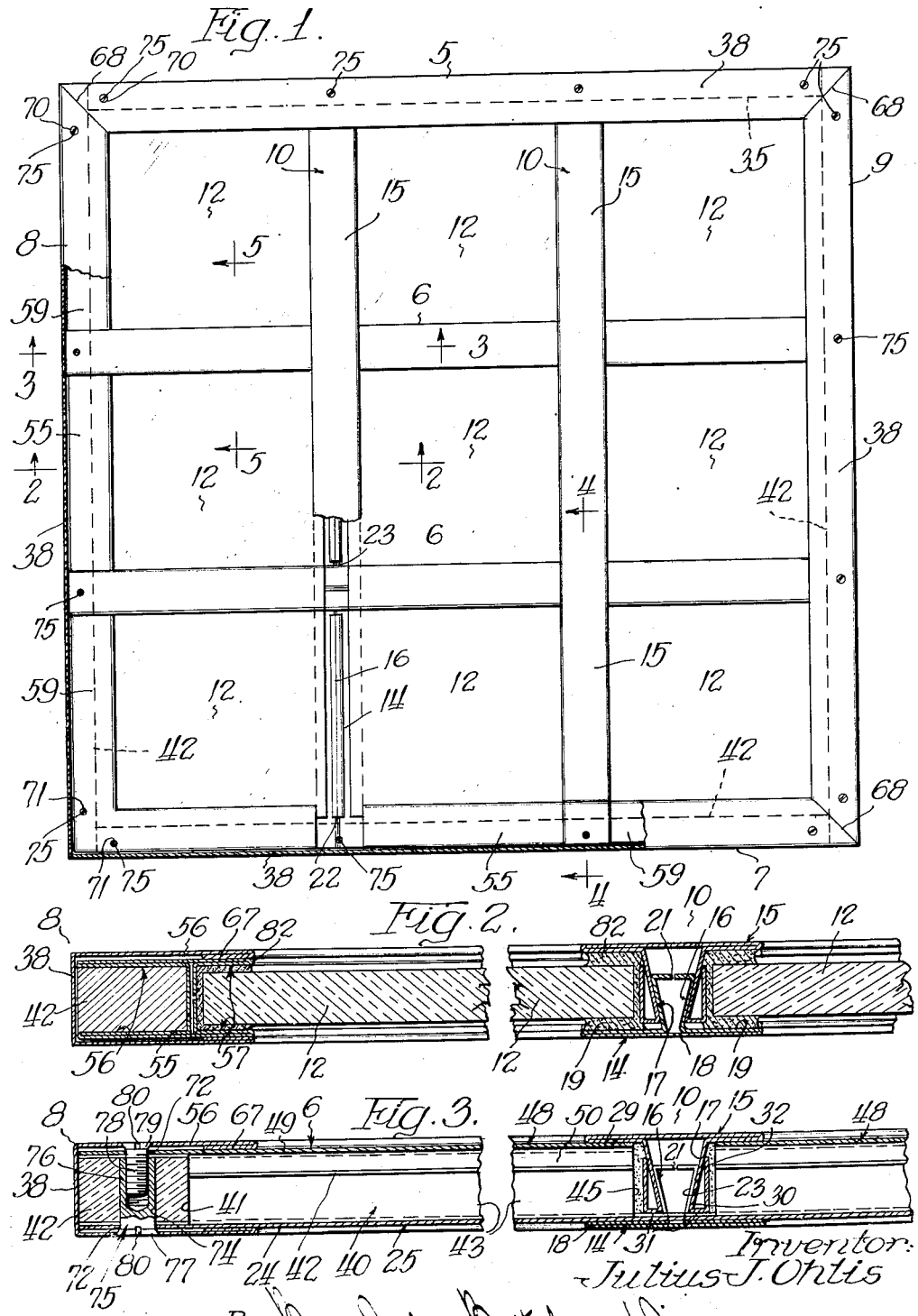

Dec. 26, 1933.   J. J. OHLIS   1,940,968
PANELING STRUCTURE
Filed Nov. 28, 1932   2 Sheets-Sheet 2
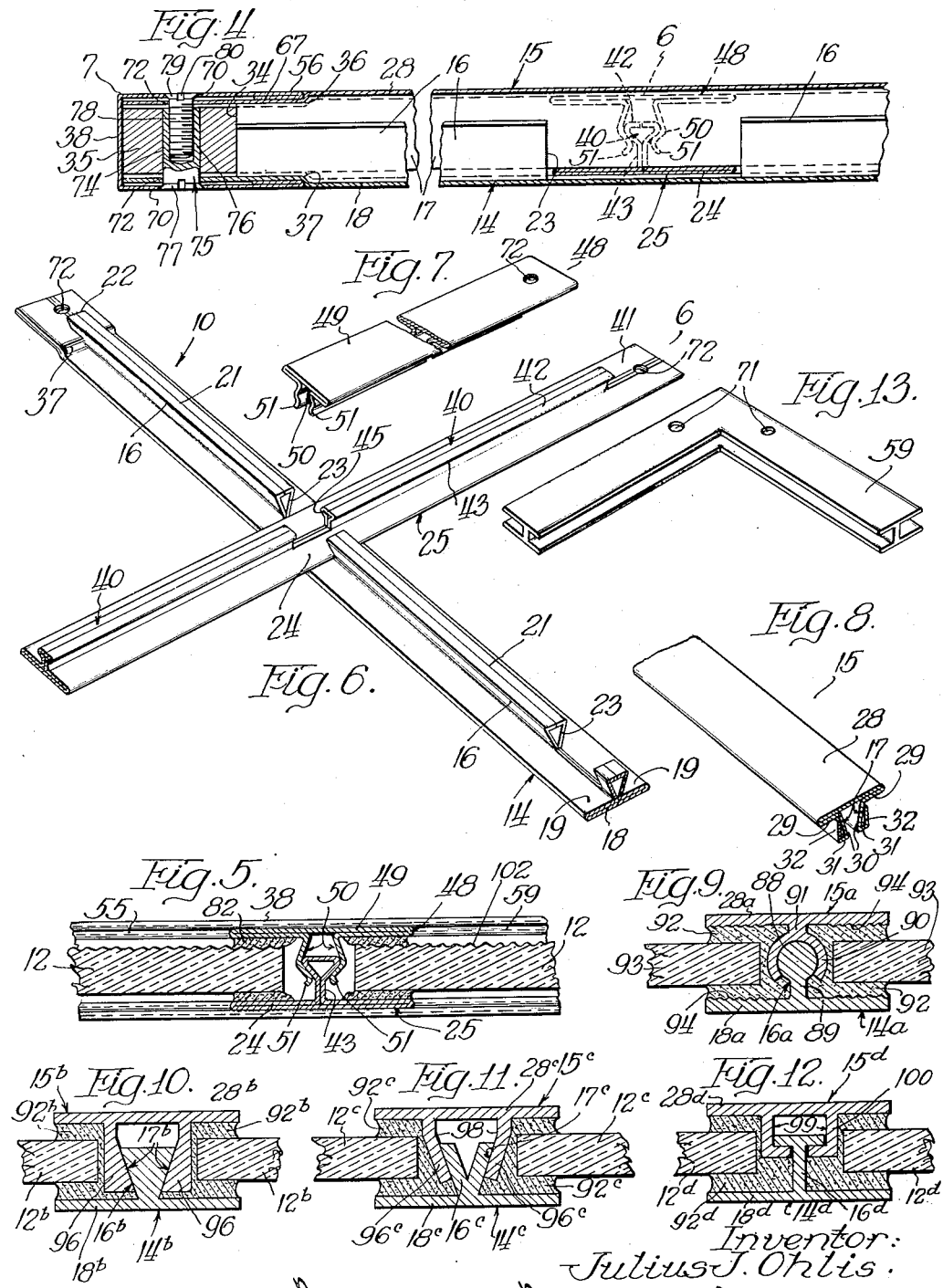
Inventor:
Julius J. Ohlis.

Patented Dec. 26, 1933

1,940,968

UNITED STATES PATENT OFFICE 1,940,968

PANELING STRUCTURE

Julius J. Ohlis, Oak Park, Ill.

Application November 28, 1932
Serial No. 644,669

18 Claims. (Cl. 189—76)

My invention relates to paneling structures.

While the particular device which I shall describe hereinafter in connection with the drawings is a glazed panel structure particularly adapted for use in glass transoms, store fronts and the like, it is to be understood that the present invention is not limited to such use but may be employed for all similar or equivalent purposes.

The paneling structure of my present invention may be used with panels of metal or fibrous material as well as with panels of glass and, where the panels are formed of glass, the structure may be used for purposes other than the purposes referred to herein.

The structure of my present invention has a number of advantages over prior art structures, and certain advantages in particular are obtained where the rails and muntins of the paneling structure are formed of aluminum or the like, but it is to be understood that these members may be formed of any other suitable or preferred metal or other material within the scope of my present invention.

It is to be further understood that these members may be brought to shape by pressing, rolling, drawing, casting, molding, extruding or otherwise as desired.

So far, there have been various schemes for making structures of this sort but, to date, manufacturers of these structures have usually had to content themselves with the use of numerous soldered and bolted joints. Certain materials, such as aluminum, cannot be soldered and welding is precluded because the heat required will break the glass panels.

With the foregoing problems in mind, it is an object of my present invention to provide a paneling structure which may be put together without welding or soldering and without bolts, except along the outer frame or rail members of the structure.

Another object is the provision of a structure which is rigid and strong and in which the parts may be put together with ease and facility and when put together are interlocked and frame the panels of the structure.

The number of panels, as well as the shapes and proportions of the panels, and the shape and proportion of the structure in its entirety may vary according to the particular installation or use to which the invention is put and the appended claims are to be construed accordingly.

Now, in order to acquaint those skilled in the art with the manner of making and using certain devices in accordance with my present invention, I shall describe certain specific embodiments of the invention in connection with the accompanying drawings.

In the drawings:

Figure 1 is a plan view of a glazed panel section embodying my present invention;

Figure 2 is a fragmentary sectional view taken on the line 2—2 of Figure 1;

Figure 3 is a fragmentary sectional view taken on the line 3—3 of Figure 1;

Figure 4 is a fragmentary sectional view taken on the line 4—4 of Figure 1;

Figure 5 is a fragmentary sectional view taken on the line 5—5 of Figure 1;

Figure 6 is a fragmentary perspective view of one of the lower vertical muntin members showing one of the lower horizontal muntin members in position across the base of the vertical member and in the notch in the interlocking tongue thereon;

Figure 7 is a fragmentary perspective view of one of the spring caps or upper parts of one of the horizontal muntin members;

Figure 8 is a fragmentary perspective view of one of the upper vertical muntin members;

Figures 9, 10, 11 and 12, are fragmentary sectional views showing alternate sections for the upper and lower vertical muntin members of the paneling structure of the present invention; and Figure 13 is a perspective view of one of the corner members of the frame.

It is to be understood that where I refer herein to certain members as vertical members and other members as horizontal members, this has reference merely to the particular arrangement illustrated in the drawings and the disposition of these members may be reversed or otherwise varied from that shown and described without departing from the spirit and scope of my present invention.

Referring first to Figures 1 to 8, inclusive, the structure therein illustrated is a glazed panel structure for transoms, store fronts, and the like. It comprises generally the top rail 5, intermediate rails or horizontal muntins 6, bottom rail 7, side rails 8, 9, vertical muntins 10 and glass panels 12.

The rail and muntin members 5, 6, 7, 8, 9 and 10, are preferably formed of aluminum, and the present invention has particular advantages where they are formed of this material, but it is to be understood that these members may be formed of any other suitable or preferred metal or other material within the scope of the present invention. In the preferred embodiment, these member are formed of sheet metal pressed to shape, but again it is to be understood that they may be formed into shape by rolling, drawing, casting, molding, extruding or otherwise as desired, depending, in many instances, upon the particular material selected for use. The panels 12, instead of being formed of glass, may be formed of metal, fiber or any other suitable or preferred material.

Each vertical muntin 10 comprises lower and upper members 14, 15. The lower member 14 has an upstanding tongue 16 of generally dovetail section for slidingly receiving and interlocking engagement with a corresponding generally dove-tail groove 17 on the bottom of the upper member 15. The base 18 extends out laterally from the opposite sides of the bottom of the tongue 16, which tongue 16 is disposed longitudinally along the base 18 centrally between its opposite edges. Where the member 14 is formed of sheet metal and pressed to shape the opposite margins of the flat strip from which it is formed may be folded in at 19 toward the center of the base 18 where the inturned portions are turned up obliquely outwardly to give the sides of the tongue 16 the desired downward taper. The free edges of the upturned portions are turned in parallel to the base 18 to form the joint 21 longitudinally along the top of the tongue. This joint 21 may be closed with the meeting edges in abutment, or it may be slightly open, as shown. The strip may, of course, be folded in any other suitable or preferred manner and the joint 21 may be disposed down along one margin of the base 18 or otherwise as desired.

The base 18 of each member 15 is continuous from end to end but the tongue 16 terminates short of the opposite ends of the base 18 to form end notches 22 for a purpose which will hereinafter appear. Each tongue 16 also has a notch or notches 23 within its length for receiving the base portions 24 of the lower members 25 of the horizontal muntins 6, it being understood that the notches 23 of the vertical muntins will be alined horizontally where there are more than one of these members, and that the particular number of notches 23 in each member 14 will correspond with the number of horizontal muntins present in the particular structure. In the simplest form, there will be only one horizontal muntin and one vertical muntin, but the number of these parts may be increased as desired beyond that.

The members 15 constitute sliding caps for the members 14 and each of these members 15 has the flat top flange 28 of substantially the width of the base flange 18, and where the member 15 is formed of sheet metal pressed to shape the margins of the strip beyond the width of the top 28 are folded in under the top 28 at 29. These inturned portions 29 are turned down obliquely inwardly at 30 to give the groove 17 formed thereby a downward taper corresponding with the taper of the tongue 16. At the lower end of the groove 17 the margins of the strip are turned out at 31 and then upwardly to form vertical legs 32, which vertical legs act as stops for the adjacent edges of the glass panes or panels 12.

The depending tongue engaging jaw of the member 15 terminates short of the opposite ends of the top portion 28 to form end notches 34 which, with the end notches 22 of the member 14, receive the structural bars 35 extending along the rails 5 and 7. Along these end notches 34 the top portion 28 and the base 18 are deformed at 36 and 37, respectively, to permit flush reception of the channel-shaped caps 38 of the rails 5 and 7, as shown in Figure 4. The top portion 28 and the depending tongue engaging jaw of the member 15 are continuous from end to end and this member is slidingly engaged with the member 14.

The lower member or base part 25 of each horizontal muntin 6 has the base 24 continuous from end to end and an upstanding longitudinally extending tongue 40. The tongue 40 terminates short of the opposite ends of the base 24 to form end notches 41 for the structural bars 42 extending along the side rails 8 and 9. Where the base member 25 is formed of sheet metal and pressed to shape it may be formed in the manner described in connection with the member 14 except that the cross-section of tongue 40, instead of being of generally dove-tail form with opposite downwardly tapering substantially flat sides, has more of a rounded head 42 with the sides brought together below the head 42 to form a restricted longitudinal neck 43.

The members 6 are placed across the members 10 and in the notches 23 with the base portions 24 in the notches 23 and upon the base portions 18 of the members 14. In the illustrated embodiment the horizontal members 6 are at right angles to the vertical members 10, but this may vary. The tongue 40 of each member 25 is notched at 45 to clear the depending tongue engaging jaw of the continuous sliding cap 15 of each vertical member 10.

The base 25 of each horizontal muntin has cap members 48 formed in individual units, one for each pane or panel 12. Each cap 48 has the flat top 49 of substantially the width of the base 24 and a depending spring jaw 50 which is adapted to be snapped in place over the tongue 40 of the member 25 and into interlocking engagement therewith. The jaw 50 is formed by folding the margins of the strip from which the cap 48 is formed in under the top 49 and down to substantially the configuration shown in Figure 5 to spring over and interlock with the tongue 40. The lower ends of the jaws 50 are preferably flared out slightly at 51 to facilitate springing the same into place over the tongues.

The jaws 50 of the outer cap members 48 terminate short of the outer ends of these cap members to form the end notches for the structural bars 42. The inner ends of these jaws 50 may extend to the inner ends of the cap members 48, and where the cap member is an intermediate one disposed between two intermediate vertical muntins the jaw 50 may extend to the opposite ends of the same. The ends of each tongue 40, at each notch 45, and the adjacent ends of the cap members 48 preferably overlap the opposite marginal edges of the base portions 18 of the members 14 so that, when the parts are assembled and the sliding cap member engaged with the tongue 16 and moved slidingly to place, the top of the cap 15 will overlap the adjacent ends of the top portions 49 of the individual spring caps 48 and bind the same in place between the base and top flanges 18 and 28.

Each rail 5, 7, 8 and 9, comprises an intermediate stile member 55, one along the outer edge of each intermediate pane 12. The stile members 55 are used between the vertical and horizontal muntins and where these parts are formed of sheet metal they may be folded as shown in Figures 2, 3, 4 and 5, to form outer channels 56 for the flat structural bars 35 and 42 and inner channels 57 for receiving the adjacent edges of the panes 12. The structural bars 35 and 42 may be formed of steel, brass, or even of wood or other suitable material, and constitute stiffening fillers around the frame of the panel structure. The stile members 55 are formed of lengths equal to the spaces between the ends of the vertical and horizontal muntins and fit between the same preferably with their ends abutting and flush with the base and top flanges of the respective members.

The corners of the frame are formed by corner pieces 59 preferably of cast iron or the like. These corner pieces 59 have the same contours and sections as the stile members 55 and act in the same capacity as the members 55 but, by their unitary construction, eliminate the necessity of joining by soldering or welding, particularly after placing the members upon the glass panes. The outer channels of these corner pieces receive the structural bars 35 and 42, and the inner channels receive the adjacent edges of the panes 12. The corner pieces 59 also have value as structural binders and act as self-squaring members when considered in conjunction with the structural bars 35 and 42.

With the ends of the base and top portions 41 and 49 of the horizontal muntins and the deformed ends of the base and top portions 18 and 28 of the vertical muntins fitting between the ends of the stile and corner members 55 and 59, a continuous channel-shaped cap member 38 is extended continuously around the entire outside frame of the structure. Where the cap member 38 is formed of sheet metal the inner margins of its legs 56 may be folded in and back beneath these legs at 67. The corners of the channel-shaped sides of the member 38 may be flush mitered and welded or soldered together at 68, or the corners may be interlocked.

For the purpose of binding the parts together, the cap member 38 has apertures 70 which register with apertures 71 in the corner members 59 and similar apertures 72 which register with apertures 73 in the ends of the respective vertical and horizontal muntins 10 and 6. The structural bars 35 and 42 have similar apertures 74 registering with the respective apertures 71, and special flush sleeves screw devices 75 are engaged through these apertures and bind the parts firmly and rigidly together.

Each screw device 75 comprises a female screw part 76 provided with a head 77 in flush engagement with one side of the cap member 38 and a male part 78 threaded into a threaded socket in the female part 76 and having a head 79 in flush engagement with the opposite side of the cap 38. Each head 77 and 79 has a kerf 80 for receiving a screw driver for applying and, if desired, removing the screw devices.

The panes or panels 12 may be secured by putty, cement, or other suitable glazing compound as shown at 82 in Figure 2, in the channels or grooves 57, and in the corresponding channels in the corner members 59 and along the horizontal and vertical muntins 6 and 10.

The structure may be assembled by positioning the base parts of the horizontal muntins across the base parts of the vertical muntin members and in the notches 23, snapping the spring caps 48 into engagement with the tongues 40 of the members 25, and then engaging the sliding caps 15 with the tongues 16 of the members 14 and sliding these caps 15 into position. The panes 12 are preferably positioned in place before applying the caps 48 and 15, but it is to be understood that the outer panes might be positioned from the open sides after application of the caps 48 and 15.

With the panes 12 in position and the caps 48 and 15 in place, the stile members 55 and corner pieces 59 are positioned over the outer margins of the panes or panels whereupon the structural bars 35 and 42 are positioned in the outer channels of these parts. The outer cap member 38 is then positioned continuously around the outside frame and is secured in place by the screw devices 75, and welded, soldered, interlocked or otherwise secured at the corners.

It is contemplated within the scope of my present invention to make the base and cap portions of certain muntin members, for example, the horizontal members in one piece instead of in two pieces as shown. This may be accomplished by making these members of generally I-shaped sections with the connecting web notched at the ends to receive the structural bars and the upper flanges and web notched at appropriate positions to clear the interlocking tongues and jaws of the vertical muntin members.

In Figure 9 I have shown an alternate sectional form for the interlocking members of the vertical muntin structure. In this case, the base member 14a and sliding cap member 15a are formed of extruded or cast metal. The upstanding tongue 16a on the base member 14a, instead of being of dove-tail section as in the preceding embodiment, has a generally cylindrical or bead-like head 88 connected integrally to the base flange 18a by a relatively restricted neck 89. The longitudinal jaw or mortis member 90 depending from cap member 15a is of generally tubular form conforming with the section of the head 88. The jaw or mortis 90 is open at the bottom, and at the top is connected integrally at 91 with the top flange 28a of the cap member. The putty, cement or glazing compound, is indicated at 92 and the adjacent marginal edges of the glass panes or panels are indicated at 93. In order to improve the grip or union between the glazing compound 92 and the base and top branches 18a and 28a the inner surfaces of these branches are preferably, or at least, may be toothed or serrated as indicated at 94.

In the section of Figure 10 the base member 14b of the vertical muntin structure has an integral upstanding tongue or tenon 16b of generally dove-tail formation tapering downwardly and integrally connected to the base flange 18b. The longitudinal jaw or mortis member depending from the cap member 15b has sides 96 integrally connected with the top flange 28b. These sides 96 are of enlarged section at their lower ends and the inner surfaces are tapered downwardly at 17b in conformity with the taper of the tongue 16b to form a dove-tail groove for slidingly receiving and interlocking engagement with the tongue 16b. The glass panes are indicated at 12b and the putty, cement or glazing compound, is indicated at 92b. As in the preceding embodiment, the base member 14b and cap member 15b of this embodiment are preferably formed of extruded or cast metal.

In the section of Figure 11 the base member 14c and cap member 15c are likewise preferably formed of extruded or cast metal. In this case, the tenon or tongue 16c is of generally Y-shaped formation, the forked arms forming a generally dove-tail tenon and the lower leg or arm being integrally connected to the base flange 18c and forming a restricted neck below the interlocking part of the tenon. The sides 96c of the interlocking jaw depending from the cap member 15c are declined at 98 to form the interlocking mortis or groove 17c.

In the section of Figure 12 the base and cap members 14d and 15d are likewise preferably formed of extruded or cast metal. In this case, the tenon or tongue 16d is of generally T-shaped section with the leg of the T integrally connected with the base flange 18d and the head of the T in interlocking engagement with a suitably formed mortis 99 in the depending jaw 100, the sides of which are integrally connected to the top flange 28d of the cap member 15d while the lower ends of these sides extend in beneath the head of the T-shaped tenon and are separated to receive the leg of the tenon.

In the illustrated embodiment of the invention, the glass panes 12 have grooves 102 disposed generally horizontally or across the vertical for diffusing the light through the building.

From the foregoing, it will now be apparent that the vertical and horizontal muntin members of the structure are positioned and connected together without welding or soldering and without bolts. The screw devices along the outer frame structure are the only securing members necessary and, with the present invention, the number of these members is reduced to a minimum. The structure is rigid and strong and the parts are all effectively interlocked and may be put together with ease and facility. The structure may be assembled with a minimum amount of time and labor, avoids the necessity of applying the heat which would be required in welding and, when assembled, presents a highly pleasing appearance.

I have illustrated and described the invention in connection with the details of certain particular embodiments, but I do not intend thereby to limit the invention to such details or embodiments, nor do I intend to be limited to the particular use and relation of the essential features shown and described.

I claim:

1. In a paneling structure, intersecting muntin structures each comprising a pair of members adapted for confining the margins of a plurality of panels, and secured together within the area defined by the outer margins of said panels solely by interlocking engagement between the margins of the panels.

2. In combination, a plurality of panel members, intersecting muntin members between said panel members, and cap members for said muntin members, said cap members being secured to said muntin members within the area defined by the outer margins of said panel members solely by interlocking engagement with said muntin members.

3. In combination, a plurality of panel members, intersecting muntin members between said panel members, cap members for said muntin members, said cap members being secured to said muntin members within the area defined by the outer margins of said panel members solely by interlocking engagement with said muntin members, and a framing structure around the outer margins of the panel members and the ends of said muntin members.

4. In combination, a plurality of panel members, intersecting muntin members between said panel members, a cap member for one of said muntin members and secured thereto within the area defined by the outer margins of the panel members solely by interlocking engagement therewith, and a cap member for another of said muntin members also secured thereto within the area defined by the outer margins of the panel members solely by interlocking engagement therewith, said last cap member having interlocking engagement with the other cap member adjacent the intersection of said muntin members.

5. In a paneling structure, a first muntin structure comprising a pair of members adapted for confining the margins of a plurality of panels, one of said members having a base part and a tongue projecting therefrom and the other member having a groove for interlocking engagement with said tongue between the margins of the panels, and a second muntin structure having base and top flanges for confining the margins of the panels and a web portion disposed between the edges of the panels, the tongue of said first muntin structure being notched and said second muntin structure being positioned in said notch with its base part seating on the base part of said first muntin structure and extending uninterruptedly thereacross.

6. In a paneling structure, a first muntin structure comprising a pair of members adapted for confining the margins of a plurality of panels, one of said members having a base part and a tongue projecting therefrom and the other member having a grooved part for interlocking engagement with said tongue between the margins of the panels, said tongue and grooved part being interlocked by endwise engagement and relative sliding movement between the members, and a second muntin structure having base and top flanges for confining the margins of the panels and a web portion disposed between the edges of the panels, the tongue of said first muntin structure being notched and said second muntin structure being positioned in said notch with its base part seating on the base part of said first muntin structure and extending uninterruptedly thereacross, the top flange and web of said second muntin structure being notched to clear the grooved part and tongue of the slidingly engaged members of said first muntin.

7. In a paneling structure, a first muntin structure comprising a pair of members adapted for confining the margins of a plurality of panels, one of said members having a base part and a tongue projecting therefrom and the other member having a grooved part of interlocking engagement with said tongue between the margins of the panels, said tongue and grooved part being interlocked by endwise engagement and relative sliding movement between the members, and a second muntin structure comprising a base part and a cap part, one having a tongue and the other having a groove for interlocking engagement with said tongue between the panels, the tongue of said first muntin structure being notched and said second muntin structure being positioned in said notch with its base part seating on the base part of the first muntin structure and extending uninterruptedly thereacross.

8. In a paneling structure, a first muntin structure comprising a pair of members adapted for confining the margins of a plurality of panels, one of said members having a base part and a tongue projecting therefrom and the other member having a grooved part for interlocking engagement with said tongue between the margins of the panels, said tongue and grooved part being interlocked by endwise engagement and relative sliding movement between the members, a second muntin structure comprising a base part having a tongue projecting therefrom, the tongue of said first muntin structure being notched and said second muntin structure being positioned in said notch with its base part seating on the base part of the first muntin structure and extending uninterruptedly thereacross, and the tongue of said second muntin structure being notched to clear the grooved part and tongue of the slidingly engaged members of said first muntin structure, and individual cap members having spring jaws adapted to be snapped into interlocking engagement with the tongue of the base part of the second muntin structure on opposite sides of the notch.

9. In a paneling structure, a first muntin structure comprising a pair of members adapted for confining the margins of a plurality of panels, one of said members having a base part and a tongue projecting therefrom and the other member having a grooved part for interlocking engagement with said tongue between the margins of the panels, said tongue and grooved part being interlocked by endwise engagement and relative sliding movement between the members, a second muntin structure comprising a base part having a tongue projecting therefrom, the tongue of said first muntin structure being notched and said second muntin structure being positioned in said notch with its base part seating on the base part of the first muntin structure and extending uninterruptedly thereacross, and the tongue of said second muntin structure being notched to clear the grooved part and tongue of the slidingly engaged members of said first muntin structure, and individual cap members having spring jaws adapted to be snapped into interlocking engagement with the tongue of the base part of the second muntin structure on opposite sides of the notch, the members of said first muntin structure confining between them the adjacent portions of the base and cap parts of said second muntin.

10. In a paneling structure, a frame comprising a plurality of corner members having inwardly opening channels for receiving the margins of the panels and outwardly opening channels, stile members positioned along the sides of the frame and between said corner members, said stile members having inwardly opening channels for the panels and outwardly opening channels, and structural bars in said outwardly opening channels.

11. In a paneling structure, a frame comprising a plurality of corner members having inwardly opening channels for receiving the margins of the panels and outwardly opening channels, stile members positioned along the sides of the frame and between said corner members, said stile members having inwardly opening channels for the panels and outwardly opening channels, structural bars in said outwardly opening channels, and muntin members positioned between the margins of the panels and across one another with their outer ends disposed between the corner and stile members.

12. In a paneling structure, a frame comprising a plurality of corner members having inwardly opening channels for receiving the margins of the panels and outwardly opening channels, stile members positioned along the sides of the frame and between said corner members, said stile members having inwardly opening channels for the panels and outwardly opening channels, structural bars in said outwardly opening channels, muntin members positioned between the margins of the panels and across one another with their outer ends disposed between the corner and stile members, and a channel cap member fitting over the corner and stile members and over the adjacent ends of the muntin members and extending around the frame.

13. In a paneling structure, a frame comprising a plurality of corner members having inwardly opening channels for receiving the margins of the panels and outwardly opening channels, stile members positioned along the sides of the frame and between said corner members, said stile members having inwardly opening channels for the panels and outwardly opening channels, structural bars in said outwardly opening channels, muntin members positioned between the margins of the panels and across one another with their outer ends disposed between the corner and stile members, a channel cap member fitting over the corner and stile members and over the adjacent ends of the muntin members and extending around the frame, and flush screw means engaging through the sides of said channel cap member and through the corner members and the ends of the muntin members.

14. In a paneling structure, a muntin structure comprising a pair of members adapted for confining the margins of a plurality of panels, one of said members having a tongue and the other member having a grooved part for interlocking engagement with said tongue between the margins of the panels, the ends of said tongue and grooved part terminating short of the ends of said muntin members to form end notches at the opposite ends of said members, and rail members having structural bars disposed in said end notches and secured to said muntin members.

15. In a paneling structure, a frame comprising a plurality of unitary corner members having inwardly opening channels for receiving the margins of the panels, and outwardly opening channels, structural bars disposed in said outwardly opening channels and secured to said corner members, and a channel cap member fitting over said bars and over said corner members and secured thereto.

16. In a paneling structure, a muntin member having an end notch and walls along said notch, a structural bar disposed in said notch between said walls and secured thereto, a channel cap member fitting over said bars and over the end of said muntin member, the walls of said member along the end notch being deformed inwardly to dispose said member flush with said cap member.

17. In a paneling structure, a first muntin structure and a second muntin structure, each of said structures comprising a base part and a tongue projecting therefrom, the tongue of both of said muntin structures being notched and the second muntin structure being disposed in the notch of the first muntin structure and with its base part seating on the base part of the first muntin structure and extending uninterruptedly thereacross, and individual cap members each having a groove for interlocking engagement with the tongues of said muntin structures.

18. In a paneling structure, a first muntin structure and a second muntin structure, each of said structures comprising a base part and a tongue projecting therefrom, the tongue of both of said muntin structures being notched and the second muntin structure being disposed in the notch of the first muntin structure and with its base part seating on the base part of the first muntin structure and extending uninterruptedly thereacross, and individual cap members each having spring jaws adapted to be snapped into interlocking engagement with the tongues of said muntin structures.

JULIUS J. OHLIS.